United States Patent [19]

Hong et al.

[11] 3,745,526

[45] July 10, 1973

[54] SHIFT REGISTER ERROR CORRECTING SYSTEM

[75] Inventors: Se J. Hong, Poughkeepsie; Arvind M. Patel, Wappingers Falls, both of N.Y.

[73] Assignee: International Business Machines Corporation, Armonk, N.Y.

[22] Filed: Dec. 20, 1971

[21] Appl. No.: 209,964

[52] U.S. Cl. .......... 340/146.1 AL
[51] Int. Cl. .......... G06f 11/12
[58] Field of Search .......... 340/146.1, 146.1 AL

[56] References Cited

UNITED STATES PATENTS

| | | | |
|---|---|---|---|
| 3,319,223 | 5/1967 | Helm | 340/146.1 AL |
| 3,629,824 | 12/1971 | Bossen | 340/146.1 AL |
| 3,648,239 | 3/1972 | Carter et al. | 340/146.1 AL |

*Primary Examiner*—Charles E. Atkinson
*Attorney*—Harold H. Sweeney, Jr. et al.

[57] ABSTRACT

An error correcting system is provided for a parallel track or parallel channel information handling system in which the information is divided into blocks of bytes of b-bits each. The information is encoded by attaching a plurality of check bytes in accordance with an H matrix consisting of a predetermined number of submatrices, each of which operates on distinct partitioned portions of the message bytes. Each of the submatrices are concatenated iteratively by b so that the matrix H can be designated by submatrices $H_{r,b}$; $H_{(r-b),b}$; $H_{(r-2b),b}$ . . . $H_{(2b+c),b}$ where $r=kb+c$ and $0 \le c < r$. Each partitioned portion of the message is operated on by a pair of shift registers to generate the check byte contribution of the respective partition. Each pair of shift registers operates on the bits of a byte in parallel and the shift registers in each partition operate in unison. The partial check bytes from the respective pairs of shift registers are modulo 2 added to obtain the check byte. Likewise, a pair of shift registers are associated with each partition of the information so that the partial syndrome byte outputs can be modulo 2 added with the respective check bits to obtain the syndrome byte. The partition in error is determined by detecting the first non-zero syndrome byte. The byte in error is located by loading the subsequent syndrome bytes of the partition in error into the corresponding shift register and shifting until the contents match the first non-zero syndrome byte, the number of shifts being indicative of the byte in error.

10 Claims, 6 Drawing Figures

PATENTED JUL 10 1973

3,745,526

SHEET 1 OF 4

PARITY CHECK MATRIX, BYTE DESIGNATIONS AND PARTITION DESIGNATIONS

SCHEMATIC REPRESENTATION OF THE PARITY CHECK MATRIX IN FIG. 1

PATENTED JUL 10 1973

3,745,526

SHEET 3 OF 4

SHIFT REGISTER GENERATION OF CHECK AND SYNDROME BITS

CHECK SYNDROME REGISTER

SHIFT REGISTER ERROR CORRECTING SYSTEM

BACKGROUND OF THE INVENTION

The invention relates to an error correcting system and, more particularly, to an error correcting system for correcting a b-bit byte in a message regardless of the number of bits in said byte which are in error.

The use of error correcting codes to improve reliability is becoming a standard procedure in modern computers. Especially in the memory, be it a core, disk file, tape or monolithic, and in the straight data transfer path, benefits of error correcting codes are clearly recognized.

Random-error-correcting codes are suitable for bit-per-card or some homogenous bit arrangements. Increasing speed and system efficiency demands have pushed the idea of bit-per-card to a cluster of bits-per-card type memory organization and, likewise, the data paths usually transfer the cluster of bits in parallel. This cluster of bits is often called a byte and hence, the name, byte oriented machine, describes most of the modern computers. A single fault in the system, either in the memory or in the data paths, is likely to affect many bits within a byte. Consequently, a byte-error correcting capability is demanded of the codes to be used in these systems. The known multiple random-error-correcting codes, which do not make use of the error dependency within the byte require unduly high redundancy and complicated decoding procedure.

Another application of byte-correcting code is in multi-channel digital systems where the channel noise often affects more than one adjacent bit in each channel independently. A fixed size cluster of bits in each channel, when viewed as a byte, lends itself to the application of byte-error-correcting codes. Accordingly, a byte means a cluster of b bits of data that are likely to be affected together by channel noise or some hardware fault due to the circuit packaging method or data format in recording. The byte length b, in general, is any positive integer.

It is well known that the error correcting code for symbols from $GF(2^b)$, (the Galois Field of $2^b$ elements) can be used for correction of byte errors. In all these byte error correcting codes, each check symbol in $GF(2^b)$ is expressed by b binary check digits and each information symbol in $GF(2^b)$, likewise, is expressed by b binary information digits. All encoding and decoding operations are performed on these clusters of *b* binary digits, thus obtaining *b*-adjacent correction corresponding to the correction of a symbol in $GF(2^b)$.

A new class of codes for single-byte-error correction is presented. The code is general in that the structure does not depend upon symbols from $GF(2^b)$. A byte is not equated to a symbol from $GF(2^b)$, but rather treated as a convenient cluster of the individual bits. Check bits may or may not be clustered as bytes and the number of check bits may be arbitrary. This class of codes contains subclasses which are equivalent to all single symbol correcting codes over $GF(2^b)$ including the binary Hamming codes. These codes are easily implementable and are considered to be either perfect or maximal.

Error-correcting systems which are capable of correcting all the digits in a character or byte of information are known, for example, U.S. Pat. No. 3,319,223, "An Error Correcting System", issued on May 9, 1967, describes an error-correcting system in which a plurality of multi-digit information characters followed by two associated multi-digit check characters can be operated on by a check character recalculating circuit that is respectively identical to the check generating circuits included in the transmitting terminal.

The arrangement is limited in that only two check characters can be generated, which limits the length of information bytes to be encoded. To accommodate long byte sequences, the previous art had to either break the information into several code words or resort to a longer byte length which increases the number of shift registers and, accordingly, the time involved increased considerably. Accordingly, it is an object of the present invention to provide an improved system for correcting a single byte error regardless of the number of bits in error for an arbitrary length of information byte sequences.

It is another object of the present invention to provide a system in which a plurality of check bytes can be generated.

It is a further object of the present invention to provide a byte error correcting system in which the code is maximal, that is, the minimum number of check bits are used for the given information length.

It is another object of the present invention to provide a shift register implementation for such a byte error correcting system.

SUMMARY OF THE INVENTION

In the error correcting system of the invention, the information sequence is divided into bytes of *b* bits each. The information is encoded in accordance with an overall matrix H which contains a predetermined number of submatrices each of which operates on distinct partitioned portions of the sequence of message bytes. Each of the submatrices are concatenated iteratively by b bits so that the H matrix can be designated by the submatrices $H_{r,b}$; $H_{(r-b),b}$; $H_{(r-2b),b}$ . . . $H_{(2b+c),b}$. Each partitioned portion of the message containing a submatrix is operated on by a pair of shift registers which generate the partial check bytes. The partial check bytes are modulo 2 added to produce the overall check byte. Likewise, the syndrome can be generated utilizing the same pairs of shift registers operating in the submatrices within the respective partitions. The partial syndromes are likewise modulo 2 added along with the corresponding partial check bytes to produce the syndrome. The partition in error is determined by detecting the first non-zero syndrome byte. The byte in error is located by loading the subsequent syndrome byte into the corresponding shift register of the partition in error and shifting until the contents match the first non-zero syndrome byte. The number of shifts being indicative of the byte in error. Once the byte in error is located, it can be corrected by inverting the digits in the message indicated as being in error by the error pattern.

GENERAL DESCRIPTION

Figure 1:
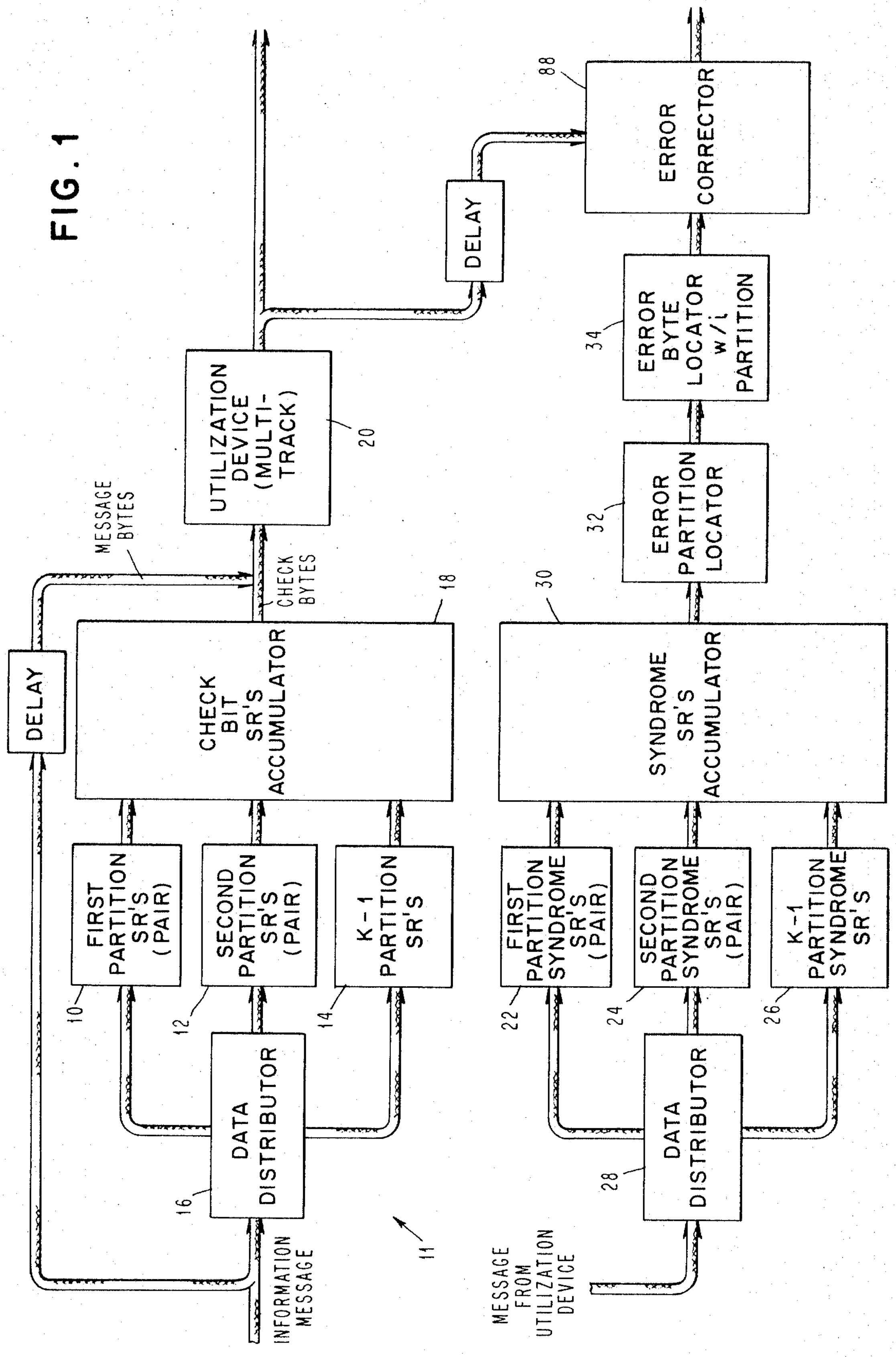
FIG. 1 is a schematic block diagram of the error correction system of the present invention.

Referring to FIG. 1, the data in the form of blocks of parallel bytes of b bits is shown entering an encoder 11 where check bytes which are generated in accordance with an H matrix to be developed later are generated. The information bytes associated with the various partitions of the H matrix are fed to respective pairs of shift registers 10,12,14 by data distributor 16. These pairs of shift registers operate on the information bytes from the respective partitions so as to generate partial check bytes. These partial check bytes are modulo 2 added in the check bit register and accumulator 18. The check bytes are appended at the end of the message bytes forming the coded message which is utilized in a multi-track device or multi-channel transmission system 20.

The information after being read or received after utilization enters data distributor 28 from whence it is distributed for decoding. The decoding is accomplished by generating a syndrome from the received message which includes the check bytes. The partial syndromes are generated by means of pairs of shift registers 22,24,26 which operate on the information bytes of the respective partitions of the H matrix. In actuality, the same shift registers utilized for generating the check bits can be used for generating the syndrome. The partial syndromes are modulo 2 added along with the associated check bits to form the complete syndrome which is accumulated in symdrome shift register 30. The syndrome contains the error pattern, that is, the errors, if any, that are developed in the utilization or transmission of the encoded message. The error partition locator 32, through a logic arrangement, in response to the syndrome, indicates the partition in which the error pattern is located. Once the partition in which the error is located has been determined, the byte in error within the partition can be found by a simple comparison, the technique utilizing shift registers in block 34. Once the byte in error has been found, the particular errors can be corrected by inverting in error corrector 88. It should be noted that the shift registers 22,24,26,30 and 34 are shown merely for convenience since in actual mechanization, the functions performed by these shift registers can be performed by the shift registers 10,12,14 and 18 in a decoding mode.

It will be appreciated by those skilled in the art that this invention can be applied to information handling systems of various capacities. The invention will, therefore, be described in algebraic terms which are applicable to any size system and subsequently in terms of a specific system example.

In order to develop the matrix theory by means of which the encoding and check bit generation of the code can better be understood, a few mathematical notations must be developed. These are the zero-concatenator, the truncator and the companion matrix.

Given a vector length $d$, the zero-concatenator operator $\Phi_{r,d}$ is defined as the following $r \times d$ matrix:

$$\Phi_{r,d} = [I_d/O_{r-D,d}],\ (r \geq d) \tag{1}$$

where $I_d$ is a $d \times d$ identity matrix and 0 denotes an all 0 matrix. If $v$ is a column vector of length $d$, it can be seen that, for $r \geq d$, $$[\Phi_{r,d}] \cdot [v] = [v\ 0\ 0\ 0 - - - - 0]^T \tag{2}$$

where $T$ indicates the transpose function. The resultant vector is an $r-d$ zero concatenation to the original vector $v$.

The trancator operator $\Phi_{d,r}$ is naturally defined as a $d \times r$ matrix, $$\Phi_{d,r} = [I_d \quad 0_{d,r-d}] = \Phi_{r,d}^T \tag{3}$$

Obviously, if $v = [v_1, v_2 - - - - v_d, v_{d+1}, - - - - v_r]^T$ $$[\Phi_{d,r}] \cdot [v = [v_1, v_2, \ldots, v_d] \tag{4}$$

which is a truncation of $(r-d)$ bits from $v$. Furthermore, the truncation on the concatenation is an identity operation and $\Phi_{d,r}$ is a left inverse of $\Phi_{r,d}$, i.e., $$[I_{d,r}] \cdot [I_{r,d}] = [I_d] \tag{5}$$

Given a polynomial $a(x)$ of degree $d$, the companion matrix T corresponding to $a(x)$ is defined as the following:

$$a(x) = \sum_{i=0}^{d} a_i x^i,\ a_0 = a_d = 1$$

$$T = \left[\begin{array}{c|c} 000\ldots\ldots00 & a_0 \\ \hline & a_1 \\ I_{d-1} & \vdots \\ & a_{d-1} \end{array}\right] (d \times d) \tag{6}$$

An equivalent definition of T is that the $i^{th}$ $(1 \leq i \leq d)$ column of T is the same as the coefficient vector of $x^i$ mod $a(x)$. Some of the useful properties of the companion matrix are:

Property 1: Let $e$ be the exponent of $a(x)$, i.e., $y = e$ is the least positive solution of $x^y = 1$ mod $a(x)$.
- i). T is non-singular;
- ii). $T^0 = T^e = I_d$
- iii). $T^i = T^j$ if $i \cong j$ mod $e$ Property 2: The $i^{th}$ column of $T^j$ is the same as the coefficient vector of the $(d-1)$ degree polynomial $x^{i+j-1}$ mod $a(x)$.

Property 3: Let $v$ be the coefficient column vector of $$v(x) = \sum_{i=0}^{d-1} v_i x^i$$

and $v'$ for $$v'(x) = \sum_{i=0}^{d-1}$$

$v_i' \; x^i \cdot T^i \cdot v = v'$, if and only if, $x^i v(x) = v'(x) \bmod a(x)$.

The linear feedback shift register corresponding to multiplying $x$ to the content polynomial modulo $a(x)$ is equivalent to multiplying $T$ to the coefficient vector of the content polynomial. If shifted backwards, one shift corresponds to multiplying $T_-^1$ to the coefficient vector of the content polynomial.

If $\alpha$ is a primitive element in (Galois Field) GF($2^r$) and a root of a primitive polynomial $g(x)$ of degree $r$, the companion matrix $T$ can be also described as the following, since $\alpha^i$ is the coefficient vector of $x^i$ mod $g(x)$.

$$T = [\alpha \; \alpha^2 \; \alpha^3 \; . \; . \; . \; \alpha^r],\; T^i = [\alpha^{i+1}, \alpha^{i+2} \; . \; . \; . \alpha^{i+r}] \qquad (7)$$

The right-multiplication of the zero concatenator on $T$ (or $T^i$) yields:

$$[T], [\Phi_{r,d}] = [\alpha \; \alpha^2 \; . \; . \; . \; \alpha^d] \qquad (8)$$

which is, interestingly, ($r$—$d$) column - truncation of the original T matrix.

We now prove a theorem for the discussions to follow.

*Theorem* 1: Let $e$ be the exponent of an irreducible polynomial $a(x)$ of degree $d$. Let $v(x) \neq 0$ be any polynomial of degree $m$ or less. Then:

$$x^i v(x) + x^j \, v(x) \equiv 0 \bmod a(x) \qquad (9)$$

implies:

$$i \equiv j \bmod e \qquad (10)$$

if and only if:

$$m < d \qquad (11)$$

*Proof*: From equation (9), $(1 + x^j{}_-{}^i)\, v(x) \equiv 0 \bmod a(x)$. If equation (11) holds, $GCD\,(v(x), a(x)) = 1$ and hence:

$$(1 + x^j{}_-{}^i) \equiv 0 \bmod a(x)$$

which implies equation (10). If $m \not< d$, let $m = d$ and $v(x) = a(x)$. This violates the implication of equation (10) · Q.E.D.

*Corollary* 1: Let $e$, $a(x)$, and $d$ be defined as in Theorem 1 and let $T$ be the companion matrix of $a(x)$. Let $v$ be any column vector of length $p$, $p \leq d$. Then:

$$T^i \, \Phi_{d,p} \, v + T^j \, \Phi_{d,p} \, v = 0 \qquad (12)$$

implies:

$$i \equiv j \bmod e \qquad (13)$$

A natural way of describing the code structure of the invention is in terms of its parity check matrix. The check portion with given r check bits will be represented by an identity matrix $I_r$. Since each byte is not treated as a symbol from $GF(2^b)$ but rather considered as a cluster of $b$ individual bits, there is no restriction on $r$. In general $r = kb + c$ where $0 \leq c < b$. The leftover $c$ check bits, if any, may form a special check byte. Another way of handling the leftover check bits is to form $k$—1 regular size check bytes and allow a special check byte of length $b + c$. The byte partitioned identity matrix can be represented in the following manner:

$$I_r = \begin{bmatrix} I_b & & & & \\ & I_b & & & \\ & & \ddots & & \\ & & & I_b & \\ & & & & I_{b+c} \end{bmatrix} (k-1)\, I_b\text{'s} \qquad (15)$$

Given r check bits and byte length b, consider the following matrix $H_{r,b}$ where $$r \geq 2b.$$

$$H_{r,b} = \left[\begin{array}{c|c|c|c|c|c} \begin{matrix}1 & & & \\ & 1 & & \\ & & \ddots & \\ & & & 1\end{matrix} & \begin{matrix}1 & & & \\ & 1 & & \\ & & \ddots & \\ & & & 1\end{matrix} & & \begin{matrix}1 & & & \\ & 1 & & \\ & & \ddots & \\ & & & 1\end{matrix} & & \begin{matrix}1 & & & \\ & 1 & & \\ & & \ddots & \\ & & & 1\end{matrix} \\ \hline \alpha^0\alpha^1 \ldots \alpha^{b-1} & \alpha^1\alpha^2 \ldots \alpha^b & & \alpha^i\alpha^{i+1} \ldots \alpha^{i+b-1} & & \alpha^{2^{r-b}-2}\alpha^0 \ldots \alpha^{b-2} \end{array}\right] \qquad (17)$$

Column vector $\alpha$ is a primitive element in GF($2^{r-b}$). Denoting by $g(x)$ the minimum function of $\alpha$ and by $T_{(r-b)}$, the companion matrix of $g(x)$, equation (17) can be rewritten as equation (18) as follows using the mathematical notations previously developed:

$$H_{r,b} = \left[ \frac{I_b}{T^0_{(r-b)} \cdot I_{(r-b),b}} \middle| \frac{I_b}{T^1_{(r-b)} \cdot I_{(r-b),b}} \middle| \ldots \middle| \frac{I_b}{T^i_{(r-b)} \cdot I_{(r-b),b}} \middle| \ldots \middle| \frac{I_b}{T^{2^{r-b}-2}_{(r-b)} \cdot I_{(r-b),b}} \right]$$

This matrix is used as a part of the information portion of the parity check matrix we are developing.

It can be shown that the $H_{r,b}$ matrix when used with an identity matrix $I_r$ forms a parity check matrix $H$ which is capable of correcting all single byte errors.

$$H = [H_{r,b} \mid I_r] \qquad (19)$$

It can be seen that each byte starts with the next successively higher column vector designated by the next higher exponent of $\alpha$ than the previous byte started with.

The information bits are the concatenation of $2^{r-c}-1$ bytes, $B_0, B_1 \ldots B_{2^{r-b}-2}$. The check bits are similarly expressed in terms of check bytes $C_1 C_2 \ldots C_k$ where $C_k$ is the special check byte of length $b + c$ as shown in equation (15).

The code word $I = B_0 B_1 \ldots B_{2^{r-b}-2}\, C_1 C_2 \ldots C_k$ satisfies the relationship which is necessary to develop the syndrome:

$$H \cdot [B_0 B_1 \ldots B_{2^{r-b}-2} C_1 C_2 \ldots C_k]^T = 0 \quad (20)$$

The corrupted code word I then produces the syndrome S given by:

$$H\hat{I} = S = [S_1 S_2 S_3 \ldots S_k]^T \quad (21)$$

where $S_i$ represents the syndrome byte corresponding to the check byte $C_i$. The code capability can be demonstrated by showing that there are distinct syndromes for each distinct single byte-error. First, any error byte in the information portion, say error pattern $E \neq 0$ in the $i^{th}$ byte, gives the following syndrome from equations (18) and (21).

$$S_1 = E \quad (22)$$

and $$[S_2 S_3 \ldots S_k]^T = [T^i{}_{(r-b)} \cdot H_{(r-b),b}] \cdot E \quad (23)$$

Since $S_1 = E \neq 0$, the vector $\Phi_{(r-b),b} \cdot E$ is non-zero. Then by Property 1 of the $T$ matrix it is clear that:

$$[S_2 S_3 \ldots S_k]^t \neq 0$$

The error byte in the check portion, however, gives the following syndromes. Let $E \neq 0$ be in the $j^{th}$ check byte.

$$S_\lambda = 0, \lambda \neq j \quad (24)$$

and $$S_j = E \neq 0 \quad (25)$$

Hence, an error in the information portion must result in at least 2 bytes of non-zero syndromes and an error in the check portion results in only one non-zero syndrome byte. Distinct errors in the check portion obviously yield distinct syndromes as seen in equation (24) and (25). Now suppose byte errors $E_1 \neq 0$ and $E_2 \neq 0$ in $i$ and $j^{th}$ $(i \neq j)$ information bytes had identical syndromes, then from equation (22) and equation (23) we have:

$$E_1 = E_2 \quad (26)$$

and $$T^i \cdot \Phi \cdot E_1 = T^j \cdot \Phi \cdot E_2 \quad (27)$$

(Subscripts on $T$ and $I$ are omitted whenever the meaning is clear without them.) Substituting $E_2 = E_1$ in equation (27), $$(T^i \Phi + T^j \Phi) \cdot E_1 = 0$$

By Corollary 1, this implies $i \equiv j \bmod (2^{(r-b)}-1)$ and since $0 \leq i,j \leq 2^{r-b}-2$, we have $i=j$. This contradicts the assumption $i \neq j$. This proves that an error in any information byte has a distinct syndrome. Furthermore, the error pattern is given by the syndrome byte $S_1$ as seen from equation (22).

It can be shown that the code described by the following parity check matrix $H$ corrects all single byte errors where $r \geq 3b$.

$$H = [H_{r,b} | (0_{b,b(2^{r-b}-1)})/(H_{(r-b),b}) \mid I_r] \quad (28)$$

The information portions corresponding to $H_{r,b}$ and $H_{(r-b),b}$ can be called the first and second partition of information bytes. An error byte in the first partition yields $S_1 \neq 0$ and at least one more non-zero syndrome byte. An error byte in the second partition yields $S_1 = 0$, $S_2 \neq 0$ and at least one more non-zero syndrome byte, since $H_{(r-b),b}$ itself is a single byte error correcting code for $r-b$ check bits. An error byte in the check portion yields one and only one non-zero syndrome byte. Distinct byte errors in the same partition yield distinct syndromes as we previously proved.

It will be appreciated that an iterative concatenation of single error correcting submatrices $H_{r,b}$; $H_{(r-b),b}$ are possible defining partitions as can be seen from equation (28), maintaining the single byte error correcting capability.

There are limits as to how far the iteration can be carried out. For example, any non-trivial byte error correcting code must have at least one information byte in addition to the check bytes. Suppose the code denoted by the following parity check matrix is a nontrivial single byte error correcting code.

$$H = [v_1, v_2 \ldots v_b \; w_1, w_2 \ldots w_b \quad \ldots] \quad (29)$$

where $v_i$ and $w_i$ are length $r$ column vectors. All error patterns in the first byte produce $2^b-1$ non-zero distinct syndromes. These syndromes can be viewed as a $b$-dimensional vector space $v$, spanned by $v_1, v_2, \ldots v_b$. The error patterns in the second byte also generate syndromes that is another dimensional vector space $w$. Furthermore, $V$ and $W$ must be disjoint for the code to be single byte error correcting. Hence, the dimensions:

$$\begin{aligned} \dim(V+W) &= \dim(V) + \dim(W) - \dim(V \cap W) \\ &= \dim(V) + \dim(W) \\ &= 2b \end{aligned}$$

which implies that $r \geq \dim(V+W) = 2b$. Accordingly, any non-trivial byte error correcting code must have $r \geq 2b$. For $r \leq 2b$ the trivial code is given by $H = [I_r]$.

In view of the above, it can be seen that, for given $r = kb + c$ check bits $(0 \leq c < b)$, $H_{(2b+c),b}$ is the smallest such single byte error correcting code with $2b+c$ check bits. This establises the limit of iterative concatenation.

The code of the invention is generated in accordance with the following parity check matrix H, where the check portion $I_r$ is divided into bytes according to equation (15).

$$H = \underbrace{}_{r} \left[ \begin{array}{c|c|c|c|c|c} & O_{bx} & O_{bx} & & O_{bx} & \\ \cline{2-3}\cline{5-5} & & O_{bx} & & O_{bx} & \\ \cline{3-3}\cline{5-5} H_{r,b} & H_{(r-b),b} & & \cdots & \vdots & I_r \\ & & H_{(r-2b),b} & & O_{bx} & \\ \cline{5-5} & & & & H_{(2b+c),b} & \end{array} \right] \quad (30)$$

(upper block row height $b$, lower block height $r-b$, total height $r$)

$$H=[P_1|P_2|\ldots|P_{k-1}|I_r] \quad (31)$$

The second form shown above is to define $k-1$ partitions for the information portion. Each partition $P_j$ contains $bx(2^{(k-j)b+c}-1)$ columns.

From the above, it can be seen that the information message can be coded in accordance with the above defined $H$ matrix. The $H$ matrix is partitioned and each partition includes a submatrix $H_{(r-jb),b}$ which, as defined previously, is individually capable of performing single byte error correction. The submatrices are iteratively concatenated as shown above to form the required $H$ matrix.

The check bits are added in the last partition in the form of an identity matrix $I_r$. It should be appreciated that as the message gets longer, the code becomes more efficient since each check bit is successively performing its function with respect to a longer message portion.

It can be shown that a message encoded according to the matrix $H$ can correct all single byte errors in the message. Any two distinct errors within a partition or within the check portion yields distinct syndromes as was previously proved. A single error $E \neq 0$ in the $i^{th}$ byte of partition $P_j$ yields the syndrome:

$$S_1 = S_2 = \ldots = s_{j-1} = 0$$

and $$[S_{j+1} \ldots S_k] = [T^i_{(r-jb)}\ I_{(r-jb),b}] \cdot E \neq 0 \quad (32)$$

whic is distinct from the syndrome of any single byte error in another partition or the check portion.

A code is called perfect if all possible $2^r$ syndromes are used to correct $2^r$ distinct error patterns. (No-error is considered as an error pattern.) A code is called maximal if there does not exist a longer code with the same error correcting capability for a given $r$. Defining $M_1$ as the number of distinct error patterns the code can correct for given $r$, we can write from the equations (15), (16) and (30), where $r \geq 2b$, that:

$$M_1=\sum_{j=1}^{k-1}(2^b-1)(2^{(k-j)b+c}-1)+(k-1)(2^b-1)+(2^{b+c}-1)+1$$

where the first summation term sums over all the partitions the product of the number of bytes and the number of nonzero patterns per byte which is $2^b-1$. The second term is for the $(k-1)$ regular size check bytes and the third term reflects the special check byte. The lst 1 is to accommodate the "no-error" situation. Rewriting:

$$M_1=(2^b-1)\sum_{i=1}^{k-1}2^{ib+c}+2^{b+c}$$

$$=2^{b+c}(2^b-1)[2^{(k-1)b}-1]/(2^b-1)+2^b \quad (35)$$

$$=2^r$$

This proves that the code is a perfect code.

Thus, the structure of the code is presented in terms of an $H$ matrix having iterative concatenation of submatrices defining partitions. Each partition defines a byte error correction code by itself, which in turn is described in terms of a generating primitive polynomial and its companion matrix. The bytes are considered as a convenient cluster of individual bits rather than a symbol from $GF(2^b)$, and hence, the byte size b does not have to divide the number of check bits $r$.

Figure 2:
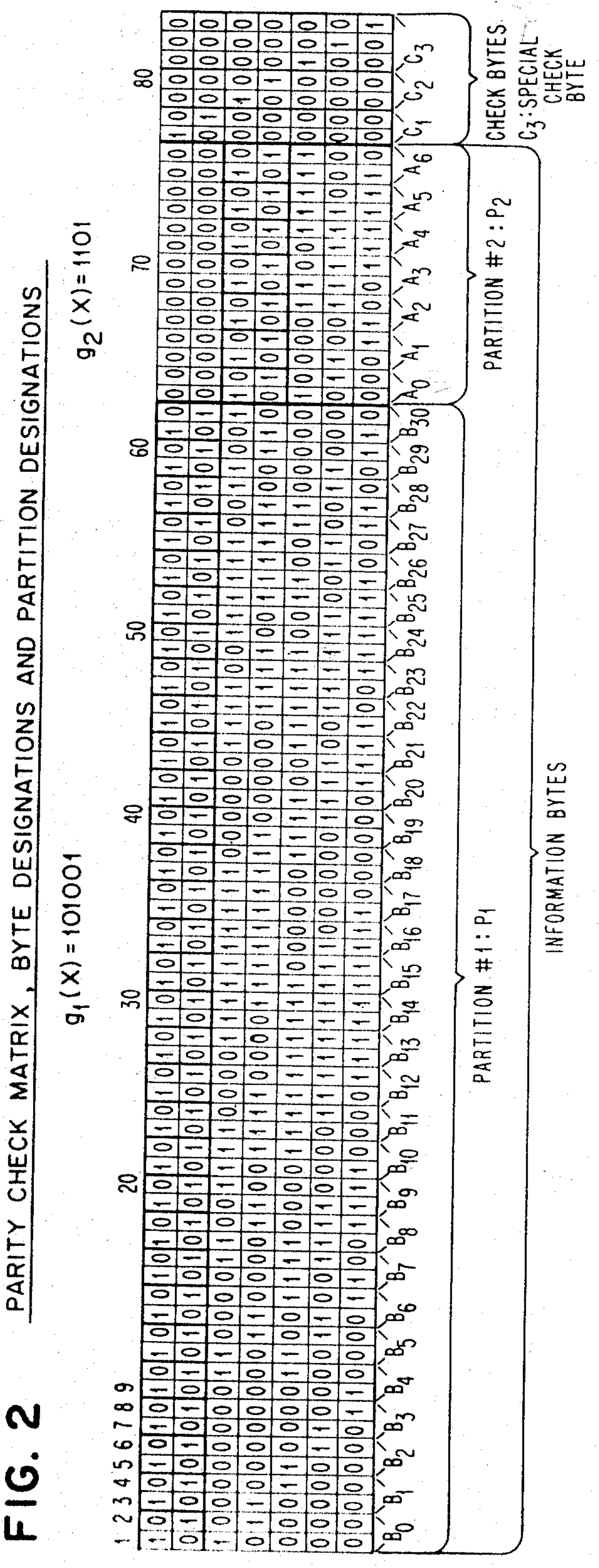
FIG. 2 is an illustrative H matrix showing the submatrices and check bits generated for given generator polynomials.

Returning now from the theoretical general case to a specific embodiment of the invention, FIG. 2 shows the parity check matrix of the code for the byte length $b=2$ and the check bits $r=7$. The submatrix forming the first partition $P_1$ of the information portion of the $H$ matrix is generated by the degree 5 primitive polynomial $g_1(x) = 1 + x^2 + x^5 = 101001$. It will be recalled from the previous theoretical discussion that the column vectors $\alpha$ are primitive elements in $GF(2^{r-b})$. In this case, $r-b=5$ and thus the degree 5 primitive polynomial is used to generate the submatrix in the first partition $P_1$. The actual columns of the submatrix in the first partition are obtained from the following values of $\alpha$:

$\alpha = 01000$
$\alpha^2 = 00100$
$\alpha^3 = 00010$
$\alpha^4 = 00001$
$\alpha^5 = 10100$
.
.
.
$\alpha^{31} = 01001$ These values of $\alpha$ are generated by considering the binary number as being shifted by one bit to the right and the last bit shifted out being inserted as the first bit if the bit is "0". If the bit being shifted out is a "1", then the primitive polynomial value 101001 is EXCLUSIVE OR'ed to the content.

Figure 3:
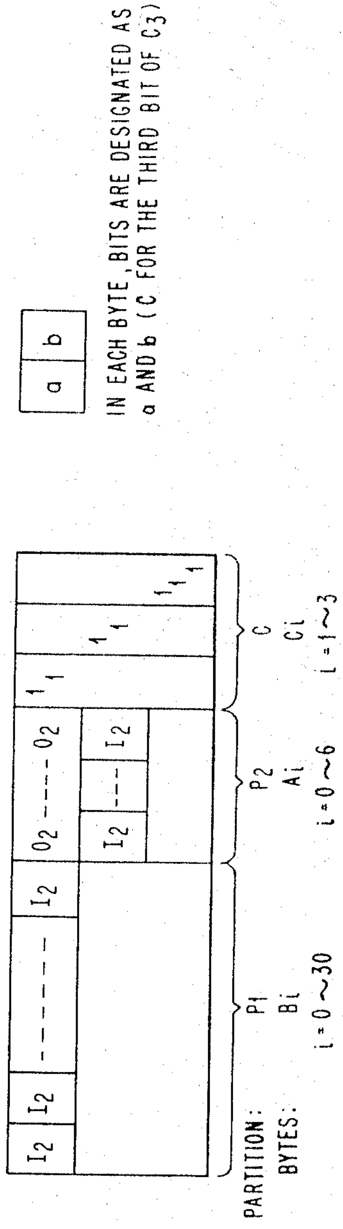
FIG. 3 is a schematic diagram showing more clearly the partitioning and offsetting or stepping of the successively connected submatrices, of the H matrix of FIG. 2.

The number of bytes included in the first partition $P_1$ is $2^5-1 = 31$, which represents 62 information bits. Likewise, the second partition $P_2$ of the information portion of the matrix is generated by the degree 3 primitive polynomial $g_2(x) = 1 + x + x^3 = 1101$. The degree 3 primitive polynomial was selected since the second partition $P_2$ has $H_{r-b}$ with $\alpha's$ from $GF(2^{r-2b})$ which gives 3, when $r=7$ and $b=2$. The number of bytes in the second partition is $2^3-1 = 7$, which represents 14 information bits. $B_0 - B_{30}$ denotes the bytes of the first partition $P_1$ and $A_0 - A_6$ denotes the bytes of the second partition $P_2$. The check portion C of the overall $H$ matrix is comprised of three separate bytes $C_1$, $C_2$ and $C_3$ of which the last check byte $C_3$ is a special size byte of length 3. The code specified by this parity check matrix is a perfect byte-error-correcting code with 7 check bits according to the theory previously described. The bits within a 2 bit byte are further designated by calling the left bit of a byte $a$ and the right bit of a byte $b$. FIG. 3 is a schematic representation of the parity check matrix of FIG. 2 showing the three partitions $P_1$, $P_2$ and $C$ and the byte and bit designation. It can be seen, that the submatrices include identity matrices $I_b$ of two bit lengths. The second submatrix, defining the second partition $P_2$, generated as denoted above, is concatenated or added to the submatrix of the first partition $P_1$ as shown. Thus, in this case, the second submatrix which is added to the first submatrix is (iteratively) stepped down with respect to the first submatrix in the first partition $P_1$ by 2 bits. The remaining bit spaces are filled with 0's. This iterative concatenation of matrices can be carried out to the limits previously defined in the theoretical discussion. The third partition $C$ of the overall $H$ matrix consists of an identity matrix $I_7$ which, in this case, is broken down into the first and second bytes $C_1$, $C_2$ with a special third byte $C_3$ of 3 bits.

As was previously mentioned, it is necessary to encode the incoming message in such a way that it can be simply and quickly decoded.

Figure 4:
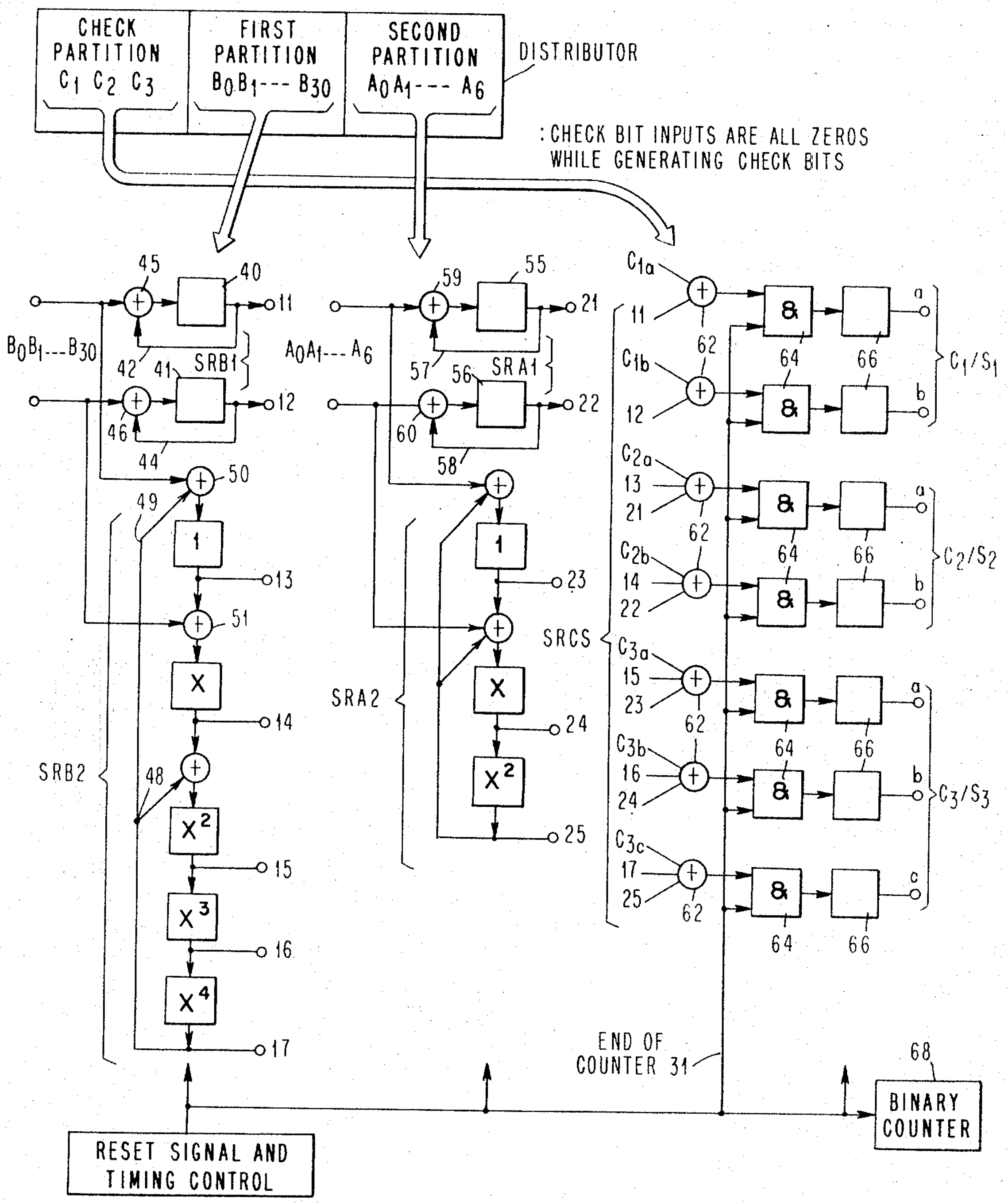
FIG. 4 is a schematic diagram of the pair of shift registers utilized in partitions 1 and 2 and the shift register accumulator for accumulating the check byte and the syndrome byte.

Referring to FIG. 4, there is shown a plurality of pairs of shift registers for performing the encoding in accordance with the previously discussed theory. It will be recalled that the structure given in equation (31), shows partitioned information portions of the code. Each partition contains its own submatrix consisting of a companion matrix and the corresponding primitive polynomial. In FIG. 4, the pair of shift registers identified as SRB1 and SRB2 operate on the information bytes $B_0, B_1, \ldots, B_{30}$ mechanizing the first partition of the $H$ matrix. Likewise, the second pair of shift registers identified as SRA1 and SRA2 operate on the information bytes $A_0$, $A_1$, . . . ,$A_6$ mechanizing the second partition of the H matrix. It will be appreciated, that subsequent pairs of shift registers are utilized for any subsequent partitions. It will be recalled, that the information bytes in our example consist of 2 bits. Thus, the inputs to SRB1 and SRB2 is in parallel and consists of both bits of a byte.

The information bytes in each partition are processed in unison to yield each partitions contribution to the check bytes. The sum of these contributions yields the check bytes. The input, for example, to the first pair of shift registers representing partition $P_1$ has the inputs $B_0, B_1, \ldots B_2{}^{(r-Jb)}-2$ as the information bytes. The shift register arrangement after $2^{(r-Jb)}-1$ yields this partial check byte. The first matrix shift register SRB1 multiplies each of the incoming bytes by $I_b$ which is the identity matrix and accumulates the results. The second shift register SRB2 multiplies $T_{(r-Jb),b}$ to the content at each shift and adds the results to $\Phi_{(r-Jb),b}B_i$ which is the incoming byte. Returning to our example where $B$ is equal to 2, the generation of the check bits is accomplished by feeding the information bytes for partition $P_1$ ($B_0$ . . . $B_{30}$) and the information bytes for partition $P_2$ ($A_0$ . . . $A_6$) as inputs to shift registers SRB1 and SRB2 and SRA1, SRA2 simultaneously in a reverse order of succession. When $A_0$ is processed, the second partition shift register SRA1 and SRA2 stop their shifting operation until the last byte of the first partition $B_0$ is shifted into the shift registers SRB1 and SRB2.

It can be seen from FIG. 4 that each of the stages 40,41 in shift register SRB1 has a feedback connection 42,44 from the output to an input modulo 2 adder circuit 45,46 where the feedback is EXCLUSIVE OR'ed with the incoming bits of the byte. The bits of the byte are inputted to the shift register stages in parallel. The shift register SRB2 has the output from the fifth stage $X^4$ fed back to the modulo 2 adder 52 located between the X and $X^2$ stage. Likewise, the same output is fed back to an EXCLUSIVE OR circuit 50 located before the first stage of the shift register. These feedback connections are made in accordance with the primitive polynomial $g(x)$ which in the example used equals $1 + X^2 + X^5$ which is equal to 101001. Similarly, the second pair of shift registers 55 and 56 operating on the second partition $A_0 - A_6$ is arranged in such a manner that the bits of a byte arrive at SRA1 in parallel and each of the register stages has a feedback 57,58 connected to modulo 2 adder circuits 59,60, respectively, which EXCLUSIVE OR ' s the input bits with the feedback. The shift register SRA2 is likewise connected according to a primitive polynomial $g(x)$ which is the generator polynomial for the submatrix of the second partition. This generator polynomial $g_2(x) = 1 + x + x^2$ which equals 1101. Thus, the feedback connection from the output stage $X^2$ is to the first and second stages as shown in FIG. 4. If a two digit byte X, for example, is contained in SRB1 and Z is the content of SRB2 and Y is now entered by a shifting operation, then the next content in SRB1 becomes $Y \oplus X$ and in SRB2, it becomes $Y \oplus T \cdot Z$. The outputs from the first pair of shift registers 10 are designated as 11 through 17 and the outputs from the second pair of shift registers 12 are designated 21 through 25. The corresponding numbered inputs, representing the connection from the corresponding outputs, can be found at the inputs to register SCRS where the inputs are applied to EXCLUSIVE OR circuit 62, the outputs of which are AND'ed with a timing signal in appropriate AND circuits 64 and stored in accumulator 66. It will be observed that when $A_0$ which is the last bit byte input in the second partition is processed by shift registers SRA1 and SRA2, the shifting operations are stopped until the last byte of the first pair of shift registers SRB1 and SRB2 operating on the first partition is processed. At the end of the total of 31 shifts, the AND gates 64 are enabled by the (end of count 31) signal. At this time, the modulo 2 sum signals 11 through 17 and 21 through 25 enter the latches of the SRCS register whose outputs $C_{1a}$, $C_{1b}$, $C_{2a}$, $C_{2b}$ and $C_{3a}$, $C_{3b}$, $C_{3c}$ form the check bytes. These check bytes, as was previously mentioned, are appended to the message to provide the encoding. The contributions of the various pairs of shift registers 10,12 to the accumulator register 18 (SRCS) should be especially noted. For example, the outputs of shift register SRB1 denoted as 11 and 12 are utilized in forming the $C_1$ portion of the check byte, made up of check bits $C_{1a}$ and $C_{1b}$. Likewise, check byte $C_2$ is contributed to by outputs 13 and 14 from shift register SRB2 and outputs 21 and 22 from shift register SRA1. The check byte $C_3$ is contributed to by shift register SRB2 as can be seen from the connections 15, 16 and 17 and from shift register SRA2 as denoted by the connections 23, 24 and 25. The various contribution of the shift registers to the different parts of the overall check bytes is important in determining or locating the partition in which the error exists.

After the generated check bytes $C_1$, $C_2$ and $C_3$ have been added to the message, the encoded information is utilized in the utilization device such as a multi-track tape device or a multi-channel transmission medium. During utilization, the encoded message may have had an error introduced therein and, therefore, should be subjected to error correction. The error correction decoding is obtained by performing the same operations on the encoded message bytes subsequent to utilization as was performed on the original message bytes before utilization to obtain the encoding. The only difference is that the received check bytes are entered into the operation which results in the generation of a syndrome. From the generated syndrome, it is possible to determine the location of the partition in which the error exists and subsequently to determine from the error pattern within the syndrome the actual byte within the partition which is in error. Actually, the operations performed on the received information bytes can be accomplished in the exact same pairs of shift registers which were utilized in connection with the operations performed on the respective partition of the original information. The only difference is that the check bit information is entered into the respective modulo 2 summing circuits 62 at the inputs to the SRCS register 18. Since the check bytes were equal to the mathematical operations performed on the information bytes, the adding of the check bit to the information bits should produce, by the EXCLUSIVE OR operation, a 0 for the syndromes generated, if there was no error in the information or check bits. The syndrome, if not 0, will contain the error pattern, that is, the bits in the syndrome will be non-zero in accordance with a pattern which can be identified so that the location of the errors can be found. The check bytes are entered into the register SRCS at the end of the count 31. The outputs of the SRCS register is the syndrome $S_1$, $S_2$ and $S_3$. As can be seen, the partial syndromes are associated with the check bytes which were utilized in generating them.

Once the syndrome $S = (S_1, S_2 \ldots S_k)$ is obtained, the erroneous partition, that is, the partition containing the error can be found according to equation (32). For example, a. If $s = 0$, then the message is error free.

b. If one, and only one, syndrome byte, say, $S_j \neq 0$, and $S_i = 0$ for all $i \neq j$, then the error is in the check byte $C_j$ and the error pattern $E = S_j$.

c. If more than one syndrome byte is non-zero, let $j$ be the first non-zero syndrome byte, then $(S_1, S_2 \ldots S_{j-1}) = 0$, $S_j \neq 0$ and $(S_{j+1} S_{j+2} \ldots S_k) \neq 0$. Accordingly, the partition $P_j$ is in error. Once the partition $P_j$ in error is determined, we know from equation (32) that the error pattern is $E = S_j$. The byte position $i$ within the partition can be determined by the appropriate use of the shift register of FIG. 1. There are two ways of doing this. In one way, the operation consists of transferring $S_{j-1}$, $S_{j-2} \ldots S_k$ into the generator polynomial $g(x)$ shift register. Then, shifting until the content equals $\Phi_{(r+jb),b} S_j$. The number of shifts are $m$ ( $\leq 2^{r-jb}-2$). The byte position I is equal to $(2^{r-jb}-1)-m$ or $I = 0$ if $m = 0$. When a shortened code is used, the shifts may never match, this indicates some uncorrectable error occurrence. Of course, this can be utilized as an additional error detection capability. The second way of determining the byte position $i$ within the partition is to transfer $S_j$ into the $g(x)$ shift register, and shaft shifting until the contents match the syndromes $S_{j+1}$, $S_{j+2} \ldots S_k$. The number of counts, in this case, gives the erroneous byte position within the partition.

Figure 5:
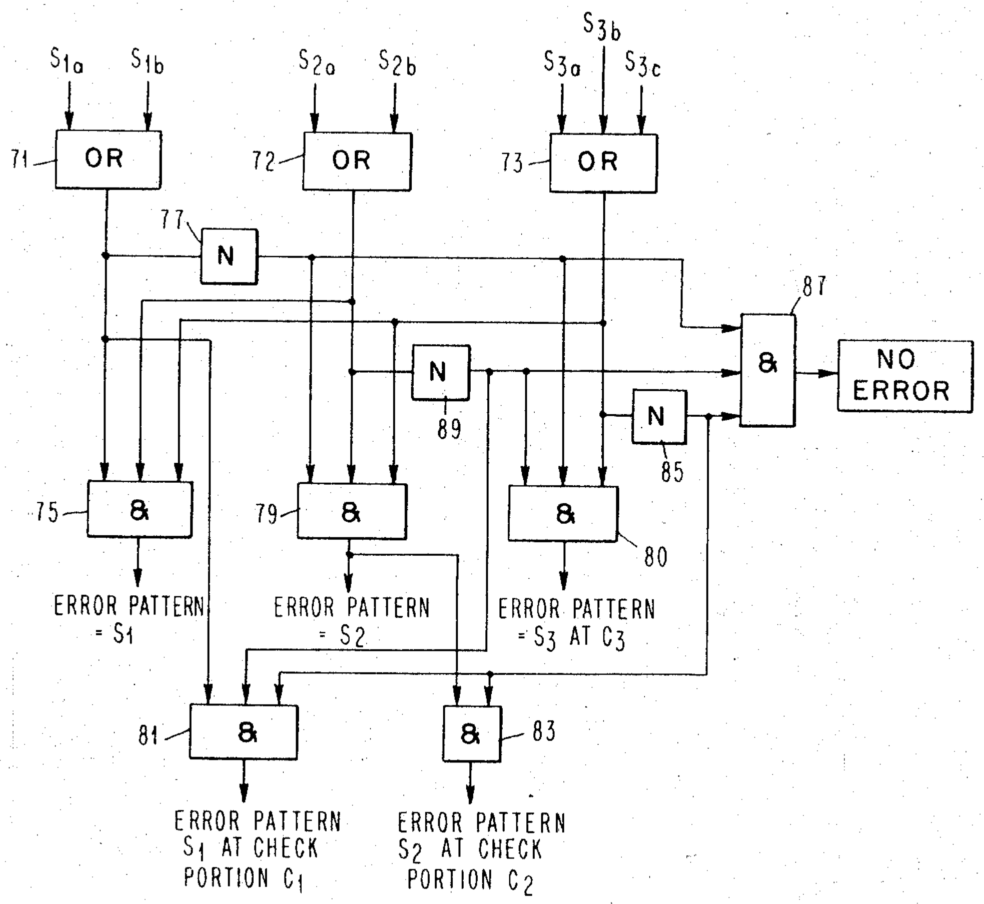
FIG. 5 is a schematic diagram showing the logic arrangement for determining the location of the partition containing the error pattern.
Figure 6:
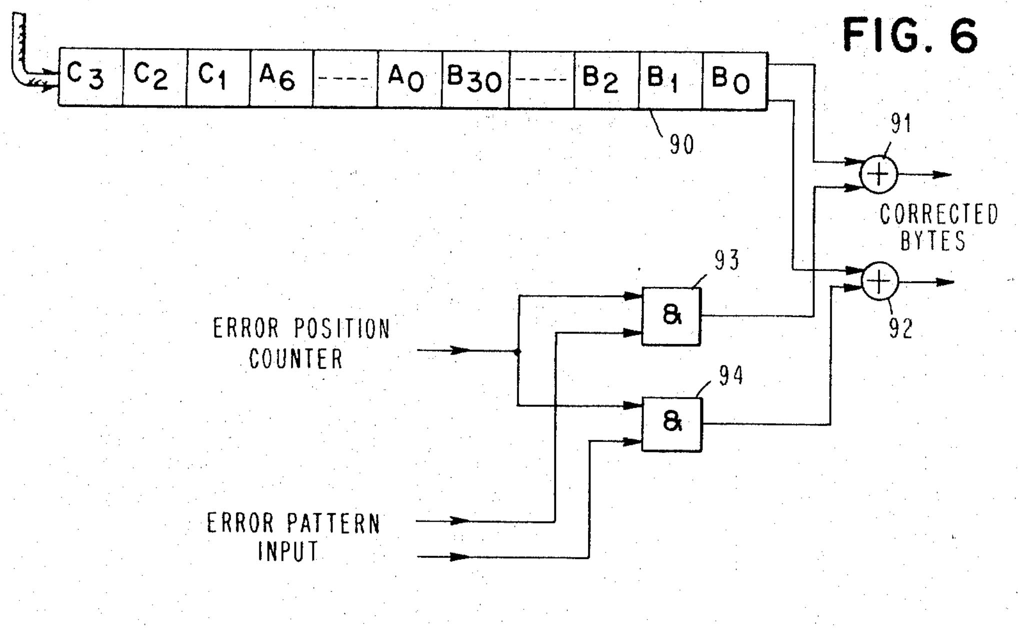
FIG. 6 is a schematic logic diagram showing the error corrector arrangement.

The logic mechanization for determining the location of the partition in error from the syndrome is shown in FIG. 5 and corresponds to the error partition locator 32 shown in FIG. 1. The various syndrome bits $S_{1a}$, $S_{1b}$, $S_{2a}$, $S_{2b}$ and $S_{3a}$, $S_{3b}$ and $S_{3c}$ as obtained from the syndrome accumulator 30 are fed in byte form to appropriate OR circuits 71,72 and 73. For example, the bits of the byte $S_1$, namely, $S_{1a}$ and $S_{1b}$ are inputted to an OR circuit 71. Similarly, $S_{2a}$ and $S_{2b}$ are connected to OR circuit 72 and $S_{3a}$, $S_{3b}$ and $S_{3c}$ are connected as inputs to OR circuit 73. It will be appreciated that if $S_{1a}$ and $S_{1b}$ are both 0, then there is no output from the OR circuit 71 and likewise there will be no output from the AND circuit 75. This indicates that the error is not in $S_1$. AND circuit 75 produces an output when all three inputs thereto are 1. The input from OR circuit 71 is 1 when the inputs $S_{1a}$ and $S_{1b}$ are not both 0. The input connection from OR circuit 72 is likewise 1 when $S_{2a}$ and $S_{2b}$ are not both 0. Similarly, the connection from OR circuit 73 is 1 when $S_{3a}$, $S_{3b}$ and $S_{3c}$ are not all zero. Thus, the 1 output obtained from AND circuit 75 indicates that the error is in the first partition which is indicated by the error pattern being in the first byte of the syndrome ($S_1$). AND circuit 79 produces an output when the input from OR circuit 72 and 73 are 1's and the input from OR circuit 71 is a 1 after being inverted by NOT circuit 77 which is connected therebetween. This indicates that the error pattern is in $S_2$ identifying the second partition as the one being in error. AND circuit 80 produces a 1 output when the three inputs thereto are 1's. The connection from OR circuit 73 carries a 1 when any one of the three input bits $S_{3a}$, $S_{3b}$ and $S_{3c}$ are non-zero. The other two inputs are 1 when the outputs of OR circuits 71 and 72 are 0 and the connection from the OR circuits 71 and 72 to AND circuit 80 contain NOT circuits 77 and 89, respectively. The 1 output thus indicates that the error pattern is in syndrome byte $S_3$ and therefore the error is in check byte $C_3$. AND circuit 81 produces a 1 output, indicating that the error pattern is in $S_1$ and the error is in check byte $C_1$, when all three inputs are 1, that is, when $S_{1a}$ and $S_{1b}$ are not both 0 and $S_{2a}$, $S_{2b}$, $S_{3a}$, $S_{3b}$ and $S_{3c}$ are all 0. The connections from OR circuits 72 and 73 are connected through NOT circuits 89 and 85, respectively. Thus, when the syndrome $S_1$ contains the error pattern and the other syndromes $S_2$ and $S_3$ are 0, the error is in check byte $C_1$. Similarly, when both inputs to AND circuit 83 are 1 indicating that $S_2$ contains the error pattern and $S_3$ is 0 since the output of OR circuit 73 is zero and there is a NOT circuit connected between OR circuit 73 and AND circuit 83. Under these conditions, the error is indicated as being in check byte $C_2$. AND circuit 87 produces an output indicating that there is no error when the entire syndrome $S$ contains all 0's. Thus, each OR circuit 71,72 and 73 puts out a 0 which is connected to AND circuit 87 through NOT circuits 77,89 and 85, respectively.

In he single byte error correction mode of operation, the following steps are taken to find the byte in error and perform the correction thereon for the embodiment set forth:

1. If all the syndrome bits are 0, then there does not exist any error and the information part of the data is considered to be error free.
2. If only one of the syndrome bytes is nonzero, (i.e., not 00 or 000) then the error is in the check bytes. The error pattern is the same as the nonzero syndrome pattern and the erroneous check byte is the one corresponding to the non-zero syndrome byte.
3. If more than one of the syndrome bytes are nonzero, the error is in the information portion. If among $S_1$, $S_2$ and $S_3$, the first non-zero byte is $S_1$, then the error is in the first partition. Thus, the error pattern is the same as $S_1$ and the position of the erroneous byte within the partition is determined as follows:

*a.* Transfer $S_1$ to shift register SRB2.

*b.* Set counter 68 to 0.

*c.* If the content of the shift register SRB2 is the same as $S_2$ and $S_3$ in shift register SRCS, then the counter 68 contents is the byte position in error.

*d.* If a match is not obtained, then add 1 to the counter and shift the shift register SRB2 by 1 shift.

*e.* Repeat (*c*) and (*d*) until a match occurs and the error byte position is determined by the count in the counter 68.

4. If $S_2$ is the first non-zero byte, the error is in the second partition and the error pattern is determined by the content of $S_2$. The erroneous byte position within the partition is determined as follows:

*a.* Transfer $S_2$ into register SRA2.

*b.* Set a counter 68 to 0.

*c.* If shift register SRA2 contents is equal to the content of $S_3$, the counter 68 contains the erroneous byte position.

*d.* If a match is not obtained, then add 1 to the counter and shift the contents of shift register SRA2 once again.

*e.* Repeat (*c*) and (*d*) until a match occurs and the error byte position is determined.

The actual error correction is performed by a mechanization shown wherein the received data that is in error is corrected by modulo 2 adding the appropriate error pattern thereto to obtain the corrected data. The error corrector 88 consists of buffers 90 to hold all the data bytes which, upon determination of the error pattern and error byte location are shifted out of the buffer and connected as inputs to EXCLUSIVE OR gates 91 and 92. The error pattern is gated in through the AND gates 93 and 94 at the proper time. The proper time is determined by the error position counter, which, as previously set forth, determines the byte in error. The outputs of AND gates 93 and 94 are connected as the other input to EXCLUSIVE OR gates 91 and 92 thereby providing the inverting of the erroneous bits of the byte in error.

While the invention has been particularly shown and described with reference to a preferred embodiment thereof, it will be understood by those skilled in the art that the foregoing and other changes in form and detail may be made therein without departing from the spirit and scope of the invention.

What is claimed is:

1. An error correction system for correcting up to b-adjacent errors in a b-bit byte of a byte-oriented binary message comprising:

encoding means for operating on said *b*-bit bytes of said binary message in parallel;

said encoding means including a plurality of pairs of shift registers;

*b* input means for each shift register of each of said pairs of shift registers;

means for distributing different portions of said *b*-bit byte message to said input means of different pairs of said shift registers in accordance with submatrices defining partitions of the message in a *H* matrix;

output means from each stage of each pair of said plurality of pairs of shift registers;

modulo two adding means for combining said output means from said plurality of pairs of shift registers;

a plurality of registers for accumulating the results of said modulo two adding means thereby providing the check bytes for encoding the binary message in accordance with the matrix *H*, said check bytes being added to said binary message to form the encoded message;

utilization means for utilizing the encoded message;

means for decoding the encoded message after utilization thereof; and means for correcting the errors found as a result of said decoding.

2. An error correction system according to claim 1, wherein each pair of shift registers operates in parallel on the bits of bytes of respective portions of said binary message defined by its respective submatrix, said pairs of shift registers operating on its respective portions in unison.

3. An error correction system according to claim 2, wherein the first shift register of each pair of said shift registers includes a modulo two addition circuit for each stage of said register and a feedback connection from the output means from each stage of said register to said respective modulo two addition circuit to perform the modulo two addition of successive incoming bits of the bytes.

4. An error correction system according to claim 3, wherein the second shift register of each pair of said shift registers includes a modulo two addition circuit at the input to the first b stages of said shift register and at the input to the stages having a corresponding term in the generator polynomial;

feedback means from the last stage of said shift register to the modulo two addition circuits having a corresponding term in the generator polynomial, the *b*-bit byte message is connected in parallel to the modulo two addition circuits of the first b stages which provides modulo two addition of the incoming byte to the shift register content.

5. An error correction system according to claim 1, wherein said means for decoding includes a further plurality of pairs of shift registers;

*b* input means for each shift register of each of said pairs of shift registers;

means for distributing different portions of said *b*-bit byte message received from said utilization means to said input means of different pairs of said shift registers in accordance with submatrices defining partitions of the message in an *H* matrix;

output means from each stage of each pair of said plurality of pairs of shift registers;

modulo two adding means for combining said output means from said plurality of pairs of shift registers and said check bits; and a plurality of registers for accumulating the results of said modulo two adding means thereby providing the syndrome bits which are grouped into syndrome bytes.

6. An error correction system according to claim 1, wherein said decoding means includes means for identifying the partition in error which comprises a logic circuit for producing a first group of outputs indicative of the first non-zero byte in the syndrome when the subsequent bytes are non-zero, a second group of outputs indicative of the first nonzero byte in the syndrome when all other bytes are zero indicating the error is in the check byte corresponding to said first non-zero byte of the syndrome and a third output indicating that all bytes in the syndrome are zero.

7. An error correcting system according to claim 6, wherein said decoding means includes means for locating the byte in error within said identified partition in error comprising means for transferring said first, non-zero syndrome byte into said second shift register of said pair of shift registers associated with said partition indicated to be in error, means for shifting said second shift register until the contents thereof match the said subsequent non-zero syndrome bytes remaining, and means for counting the number of shifts required to obtain said match, said count being indicative of the byte in error within the partition indicated to be in error.

8. An error correction system according to claim 1, wherein said means for correcting the bits in error in said indicated byte includes a plurality of EXCLUSIVE OR circuits, each having as an input thereto a different one of the bits of each of the utilized message bytes and the corresponding bits resulting from said decoding means, the output therefrom being the corrected bits.

9. An error correction system according to claim 1, wherein said encoding and decoding means are connected in accordance with a matrix H which comprises a plurality of submatrices $H_{r,b}$; $H_{(r-b),b}$; $H_{(r-2b),b}$. . . $H_{(2b+c),b}$ generated by means of a primitive polynomial of degree $r-jb$ here $j = 1,2,3$ . . . ; each successive submatrix being concatenated iteratively by successive steps of $b$, said submatrices forming partitions in said $H$ matrix, a check bit partition is appended to the last of said partitions, an identity matrix $I_r$ is contained within said check bit partition thereby forming the H matrix for determining the connections for the encoding and decoding means for said binary message.

10. An error correction system according to claim 9, wherein the encoding and decoding means connected in accordance with each of said submatrices $H_{r,b}$; $H_{(r-b),b}$; $H_{(r-2b),b}$ . . . $H_{(2b+c),b}$ is separately capable of $b$-adjacent error correction and the matrix H formed thereby is capable of $b$-adjacent error correction of longer binary messages using the minimum number of check bits.

* * * * *